US008782103B2

(12) United States Patent  (10) Patent No.: US 8,782,103 B2
Ahlborn  (45) Date of Patent: Jul. 15, 2014

(54) MONITORING SYSTEM FOR OPTIMIZING INTEGRATED BUSINESS PROCESSES TO WORK FLOW

(75) Inventor: James T. Ahlborn, Downington, PA (US)

(73) Assignee: Dell Products, LP, Round Rock, TX (US)

( * ) Notice: Subject to any disclaimer, the term of this patent is extended or adjusted under 35 U.S.C. 154(b) by 235 days.

(21) Appl. No.: 13/446,589

(22) Filed: Apr. 13, 2012

(65) Prior Publication Data

US 2013/0275475 A1  Oct. 17, 2013

(51) Int. Cl.
*G06F 17/30* (2006.01)

(52) U.S. Cl.
USPC ........................................................ 707/812

(58) Field of Classification Search
CPC ... G06F 17/30; G06F 17/30864; G06F 21/00; G06F 21/6218; G06F 21/6227; G06F 17/30684; G06F 3/048; G06F 17/24; G06F 17/243; G06F 17/28; G06F 17/30011; G06F 17/30616; G06F 17/30979; G06F 21/10; G06Q 10/10; G06Q 10/06; G06Q 40/00; G06Q 50/18; G06Q 10/00; G06Q 10/0633; G06Q 10/0635; G06Q 10/107; G06Q 30/02; G06Q 10/0637; G06Q 10/067; G06Q 20/40; G06Q 30/0283; G06Q 30/04; H04L 63/0815; H04L 63/0435; H04L 12/5835; H04L 12/66; H04L 51/066; H04L 2209/42; H04L 2209/56; H04L 2209/603; H04L 29/00; H04L 51/04; H04L 63/0227; H04L 63/0807; H04L 63/1416; H04L 63/142
USPC ........................................................ 707/812
See application file for complete search history.

(56) References Cited

U.S. PATENT DOCUMENTS

| 5,410,675 | A | 4/1995 | Shreve et al. |
| 5,794,246 | A | 8/1998 | Sankaran et al. |
| 5,917,730 | A | 6/1999 | Rittie et al. |
| 5,953,533 | A | 9/1999 | Fink et al. |
| 6,014,670 | A | 1/2000 | Zamanian et al. |

(Continued)

FOREIGN PATENT DOCUMENTS

WO  WO 02/102097 A1  12/2002
WO  WO 2008/134627 A2  11/2008

OTHER PUBLICATIONS

Boomi Integration Platform datasheet Boomi, Inc., 2006.
Boomi on Demand product data sheet Boomi, Inc., 2007.

(Continued)

*Primary Examiner* — Usmaan Saeed
*Assistant Examiner* — Jagdish Pandya
(74) *Attorney, Agent, or Firm* — Larson Newman, LLP

(57) ABSTRACT

An information handling system comprises a connection via a network interface for receiving data representing business process data from an integrated business process running at a location, the business process data comprising at least data indicating from where documents are received. The system also comprises a storage device for storing data representing an aggregate of business process data for an integrated business process, and a processor adapted to determine from the aggregate business process data whether the integrated business process running at the location receives documents from an external trading partner that, if the integrated business process receives documents from the external trading partner, then the processor prepares instructions to select an information handling system environment for running the integrated business process having additional disk space or solid state drive resources.

18 Claims, 8 Drawing Sheets

(56) References Cited

U.S. PATENT DOCUMENTS

| | | | |
|---|---|---|---|
| 6,032,158 A | 2/2000 | Mukhopadhyay et al. | |
| 6,038,590 A | 3/2000 | Gish | |
| 6,044,374 A | 3/2000 | Nesamoney et al. | |
| 6,106,569 A | 8/2000 | Bohrer et al. | |
| 6,115,690 A | 9/2000 | Wong | |
| 6,134,706 A | 10/2000 | Carey et al. | |
| 6,208,990 B1 | 3/2001 | Suresh et al. | |
| 6,223,180 B1 | 4/2001 | Moore et al. | |
| 6,339,775 B1 | 1/2002 | Zamanian et al. | |
| 6,343,275 B1 | 1/2002 | Wong | |
| 6,418,400 B1 | 7/2002 | Webber | |
| 6,626,957 B1 | 9/2003 | Lippert et al. | |
| 6,640,226 B1 | 10/2003 | Shringeri et al. | |
| 6,789,096 B2 | 9/2004 | Sankaran et al. | |
| 6,820,077 B2 | 11/2004 | Godfredsen et al. | |
| 6,820,135 B1 | 11/2004 | Dingman et al. | |
| 6,823,373 B1 | 11/2004 | Pancha et al. | |
| 6,850,947 B1 | 2/2005 | Chung et al. | |
| 6,854,107 B2 | 2/2005 | Green et al. | |
| 6,895,409 B2 | 5/2005 | Uluakar et al. | |
| 6,895,471 B1 | 5/2005 | Tse et al. | |
| 6,922,831 B1 | 7/2005 | Kroening et al. | |
| 6,988,165 B2 | 1/2006 | White et al. | |
| 6,993,743 B2 | 1/2006 | Crupi et al. | |
| 6,996,584 B2 | 2/2006 | White et al. | |
| 7,117,215 B1 | 10/2006 | Kanchwalla et al. | |
| 7,162,643 B1 | 1/2007 | Sankaran et al. | |
| 7,171,647 B1 | 1/2007 | Smith et al. | |
| 7,181,457 B2 | 2/2007 | Reinauer et al. | |
| 7,496,888 B2 | 2/2009 | Sanjar et al. | |
| 7,499,951 B2 | 3/2009 | Mueller et al. | |
| 7,590,724 B1 | 9/2009 | Williams | |
| 7,610,575 B2 | 10/2009 | Sproule | |
| 7,792,784 B2 | 9/2010 | Gupta | |
| 7,941,784 B2 | 5/2011 | Shenfield et al. | |
| 8,036,939 B2 | 10/2011 | Gil et al. | |
| 8,060,396 B1 | 11/2011 | Bessler et al. | |
| 8,095,416 B2 | 1/2012 | Harvey et al. | |
| 8,126,762 B2 | 2/2012 | Ramachandran et al. | |
| 8,165,993 B2 | 4/2012 | Broda et al. | |
| 8,271,615 B2 | 9/2012 | Ellison et al. | |
| 8,276,115 B2 | 9/2012 | Bates et al. | |
| 2001/0052112 A1 | 12/2001 | Mohan et al. | |
| 2002/0016771 A1 | 2/2002 | Carothers et al. | |
| 2002/0073396 A1 | 6/2002 | Crupi et al. | |
| 2002/0095650 A1 | 7/2002 | Green et al. | |
| 2002/0104067 A1 | 8/2002 | Green et al. | |
| 2003/0221184 A1 | 11/2003 | Gunjal et al. | |
| 2003/0236677 A1 | 12/2003 | Casati et al. | |
| 2004/0044689 A1 | 3/2004 | Krabel et al. | |
| 2004/0068431 A1 | 4/2004 | Smith et al. | |
| 2004/0133876 A1 | 7/2004 | Sproule | |
| 2005/0005262 A1 | 1/2005 | Mohan et al. | |
| 2005/0187993 A1 | 8/2005 | Selman et al. | |
| 2005/0198618 A1 | 9/2005 | Lalonde et al. | |
| 2005/0251501 A1* | 11/2005 | Phillips et al. | 707/2 |
| 2005/0273758 A1 | 12/2005 | Long | |
| 2006/0015619 A1 | 1/2006 | Tse et al. | |
| 2006/0161495 A1 | 7/2006 | Wigzell | |
| 2006/0184933 A1 | 8/2006 | Chessell et al. | |
| 2007/0061393 A1 | 3/2007 | Moore | |
| 2007/0168206 A1 | 7/2007 | McCall et al. | |
| 2008/0163164 A1 | 7/2008 | Chowdhary et al. | |
| 2008/0196006 A1 | 8/2008 | Bates et al. | |
| 2008/0209078 A1 | 8/2008 | Bates et al. | |
| 2008/0270977 A1 | 10/2008 | Nucci et al. | |
| 2008/0306973 A1 | 12/2008 | Richard | |
| 2009/0112666 A1 | 4/2009 | Guo et al. | |
| 2010/0023362 A1 | 1/2010 | Nguyen et al. | |
| 2010/0070981 A1 | 3/2010 | Hadar | |
| 2010/0229111 A1 | 9/2010 | Eugene et al. | |
| 2010/0306709 A1 | 12/2010 | Lynch et al. | |
| 2011/0225466 A1 | 9/2011 | Resch et al. | |
| 2011/0282715 A1 | 11/2011 | Nguyen et al. | |
| 2012/0041945 A1 | 2/2012 | Blubaugh | |
| 2013/0246130 A1* | 9/2013 | Michel et al. | 705/7.36 |

OTHER PUBLICATIONS

Boomi AS2 Transport datasheet Boomi, Inc., 2006.

Boomi, Inc., Announces General Availability of the Boomi Integration Platform V3.0, PR Newswire, Jan. 16, 2004.

Dell Agrees to Acquire Software Firm Boomi Wall Street Journal, Nov. 3, 2010.

Silk, Scott, Automating the Balanced Scorecard Management Accounting, vol. 19, No. 11, May 1998.

Arnold, Tom, Dashboard & Scorecard Software Tools for Operations Management and Strategy Deployment Summit Media Partners, Sep. 18, 2002.

Norton, David, SAP Strategic Enterprise Management: Translating Strategy Into Action: The Balanced Scorecard SAP, May 1999.

TIBCO Staffware Process Suite product brochure TIBCO Software Inc., 2006.

Chambers, Bill et al., Real-Time Data Access Using Business Process Management VARBusiness, vol. 19, No. 23, Nov. 10, 2003.

Sturim, Robert, Achieving Competitive Advantage Through Supply Chain Integration Vitria Technology Inc., 1999.

Intalio Adds Celequest BAM Technology to Its BPMS Solution; Celequest Management Dashboards Integrated into Intalio/BPMS, Business Wire, Jan. 17, 2006.

Viane, Stijn et al., Corporate Performance Management: Beyond Dashboards and Scorecards Journal of Performance Management, vol. 20, No. 1, 2007.

Ergometrics.com web pages Ergometrics, Mar. 2000, Retrieved from Archive.org Jan. 25, 2007.

iDashes.net web pages iDashes, Inc., May 2001, Retrieved from Archive.org Jan. 25, 2007.

Performance Dashboards: Measuring, Monitoring, and Managing Your Business: Education and Research The Data Warehouse Institute, PowerPoint presentation, 2006.

Eckerson, Wayne E., Performance Dashboards: Measuring, Monitoring, and Managing Your Business: John Wiley & Sons, ISBN 13-978-0-471-724179-9, 2006.

"The Quest for a Cloud Integration Strategy," Boomi Whitepaper, 2011, http://marketing.boomi.com/QuestForCloudIntegration.html.

* cited by examiner

__US 8,782,103 B2__

MONITORING SYSTEM FOR OPTIMIZING INTEGRATED BUSINESS PROCESSES TO WORK FLOW

CROSS REFERENCE TO RELATED APPLICATIONS

Related subject matter is contained in co-pending U.S. patent application Ser. No. 12/110,607 entitled "System and Method For Automated On-Demand Creation of a Customized Software Application," filed on Apr. 28, 2008, the disclosure of which is hereby incorporated by reference.

Related subject matter is also contained in co-pending U.S. patent application Ser. No. 13/333,517 entitled "System to Automate Development of System Integration Application Programs and Method Therefor," filed on Dec. 21, 2011, the disclosure of which is hereby incorporated by reference.

FIELD OF THE DISCLOSURE

This disclosure generally relates to information handling systems, and more particularly relates to monitoring integrated business processes.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
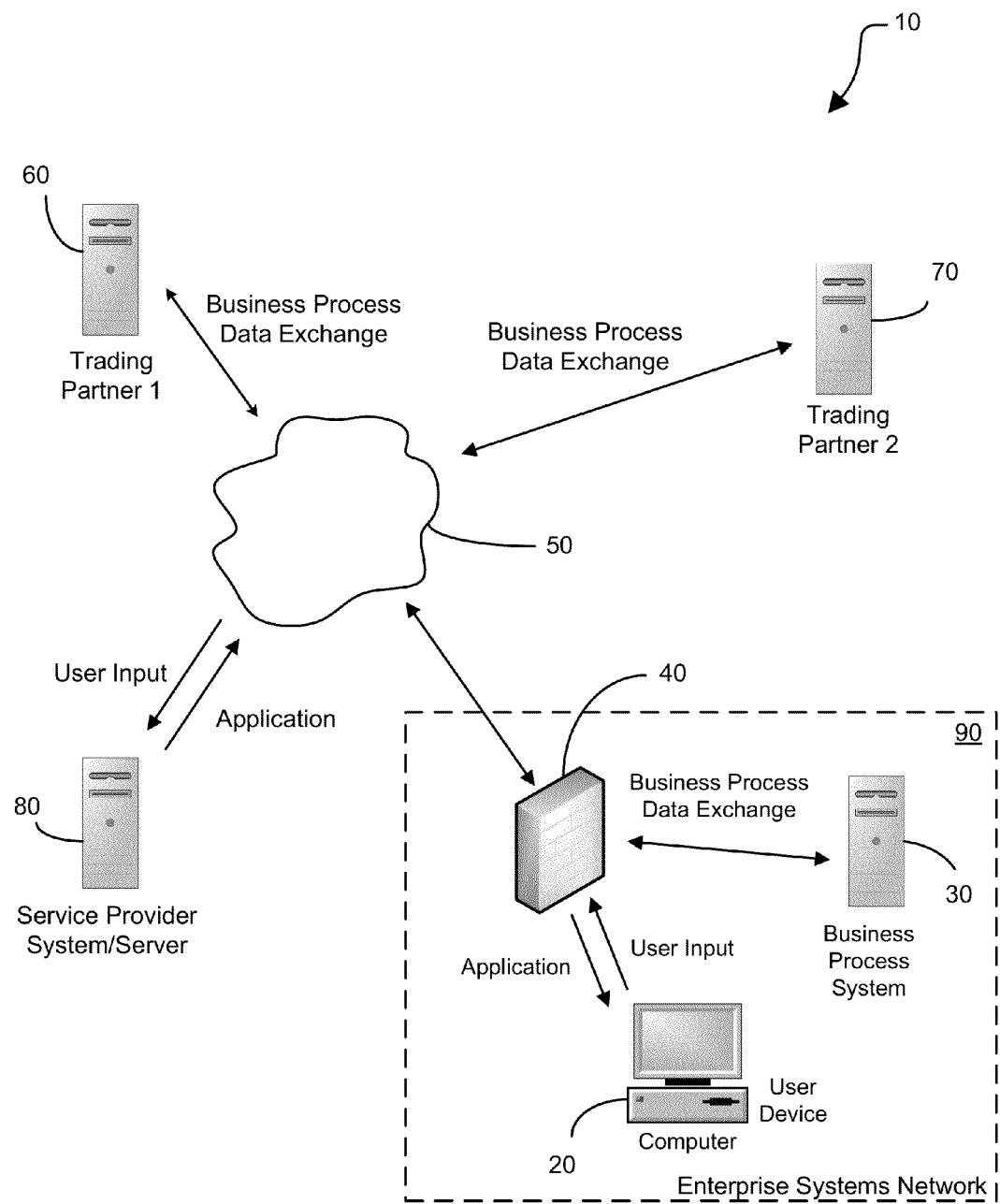
FIG. 1 is a block diagram illustrating a distributed business network system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Today, most businesses and other enterprises have sophisticated computing systems that are used for facilitating internal operations and for communicating outside the enterprise's network, for example to exchange information with business partners. Much of present day information exchange is conducted electronically, via communications networks, both internally to the enterprise, and among enterprises. Accordingly, it is often desirable or necessary to exchange information or data between distinctly different computing systems, computer networks, software applications, etc. The enabling of communications between diverse systems or networks or applications in connection with the conducting of business processes is often referred to as business process integration.

Relatively recently, systems have been established to enable exchange of data via the Internet, such as via web-based interfaces for business-to-business and business-to-consumer transactions. For example, a buyer may operate a personal computer (PC) to connect to a seller's website to manually enter data using a web interface provided by the seller's computing system. In higher volume environments, a buyer may use an executable software application known as Electronic Data Interchange (EDI) Software, or Business-to-Business Integration Software to connect to the seller's computing system and to deliver electronically a business document, such as a purchase order, without requiring human intervention to manually enter the data. These applications are typically purchased from software vendors and installed on a computerized system owned and maintained by the business, in this example the buyer. The seller will have a similar or complementary software application on its system, so that the information exchange may be completely automated in both directions. In contrast to the system presently disclosed, these applications are purchased, installed and operated on the user's local system. Thus, the user typically owns and maintains its own copy of the system, and configures the application locally to connect with its trading partners.

In both the traditional and more recent approaches, the executable software application is universal or generic as to all trading partners before it is received and installed within a specific enterprise's computing network. In other words, it is delivered to different users or systems in an identical, generic form. The software application is then installed within a specific enterprise's computing network, which may include data centers, etc. located outside the physical boundaries of the enterprise. After the generic application is installed, it is then configured and customized for a specific trading partner. The customized application can be executed to exchange data between the specific trading partner and the enterprise. For example, Wal-Mart may provide on its website specifications of how electronic data such as Purchase Orders and Invoices must be formatted for electronic data communication with Wal-Mart, and how that data should be communicated with Wal-Mart. A supplier or enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

In the business process integration context, communication should occur between different software applications or systems within a single computing network, such as between an enterprise's information warehouse management system and the same enterprise's purchase order processing system. Communication should also occur between different software applications or systems within different computing networks, such as between a buyer's purchase order processing system and a seller's invoicing system. Upon integration of the business processes, it is helpful to users to be able to monitor various metrics relating to the integrated processes. For example, the monitored information may be used for diagnostic purposes and planning purposes. The data gathered while monitoring the execution of an integrated business process event may be stored as a business process execution record for that event. The types of data gathered and the historical record of that gathered data may be referred to as monitored business process data.

A more comprehensive set of data relating to further detail about the integrated business processes may also be gathered. This additional detailed data may be referred to as tracked data. This tracked data may be important in the business-to-business (B2B) context. Tracked data allows a user access to details enabling a more thorough analysis and diagnosis of an integrated business process. For example, a user may track progress of orders more effectively in an integrated business process with tracked data.

In particular, when multiple integrations are simultaneously operating, the collection of monitored integrated business process data or the higher level tracked data may be very valuable to the users of the integrated business processes. It depends on the context of the usage. For example, depending on the workload of the integrated business process that is detected or indicated, adjustments may be made to the systems that run integrated business process software or the selection of which systems are used to run the software. Thus, there is a significant need to monitor integrated business processes and provide useful and versatile feedback and automatic adjustment to the integrated business process.

U.S. patent application Ser. No. 12/110,607 is entitled "System and Method For Automated On-Demand Creation of a Customized Software Application." This application, filed Apr. 28, 2008 is commonly owned by the assignee of this patent application and incorporated herein by reference. U.S. patent application Ser. No. 12/110,607 illustrates a system and method for automated development of customized executable system integration software applications. For example, an enterprise can define an integration system via a modeling process to enable bi-directional exchange of data between internal applications, between internal applications and external trading partners, or between internal applications and applications running external to the enterprise. Applications running external to the enterprise are commonly referred to as Software as a Service (SaaS). Integration software can assist defining the business process to be integrated by a user. Each integrated business process represents a complete end-to-end interface. For example, a process could be customized to accept a purchase order (PO) from a retailer such as Wal-Mart, transform the PO into a format recognizable by a certain internal order management software application of the enterprise, and then insert the contents of that PO directly into the enterprise's order management system. The customized executable system integration software application that results provides the desired interoperability as defined by the party using the integration software application code. It is optimization of integrated business processes operating using these customized executable system integration software applications that is discussed herein.

FIG. 1 shows a distributed business network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a personal computer, enabling a user to communicate via a communications network 50, such as the Internet. The exemplary user device 20 may be configured with conventional web browser software. The web browser, such as Microsoft Corporation's Internet Explorer web browser software, allows the user to interact with websites via the network 50. The client device 20 is positioned within an enterprise network 90 behind an enterprise network's firewall 40. For illustrative purposes, the enterprise network 90 includes a business process system 30, which may include conventional computer hardware and commercially available Enterprise Resource Planning (ERP) and other business process software, such as QuickBooks, SAP's MySAP ERP, Oracle's OneWorld JD Edwards' ERP, Infor's WMS application, and the like. The system 10 further includes trading partner systems 60 and 70 for receiving and/or transmitting data relating to business-to-business transactions. For example, Wal-Mart may operate trading partner system 60 to allow for issuance of purchase orders to suppliers and to receive invoices from suppliers in electronic data form as part of electronic data exchange processes.

Finally, the system 10 includes a service provider system or server 80. In one embodiment, the service provider server 80 may generate a customized executable system integration software application to run an integrated business process at an enterprise location or another hosted location. In another embodiment, the service provider server 80 may monitor one or more business processes running at various locations. Business process data may be reported to the service provider server 80 from business processes running at hosted locations or enterprise locations in various embodiments. This business process data may be aggregated and stored at the server 80. In an additional embodiment, the service provider server 80 may administer one or more business processes. The service provider server 80 may run an optimization system and issue commands to adjust resources available to an integrated business process. In a different embodiment, the service provider server 80 may generate and implement executable code changes to the customized executable system integration software application. In other embodiments, one or more functions described above may occur at a system or server in a different location, such as an enterprise network 90 or at a trading partner location.

The system and methods disclosed herein allow a service provider, an enterprise, or even a trading partner to have an adjustment made to a customized executable system integration software application running at an enterprise location or another hosted location. Data may be monitored reflecting the execution of an integrated business process. The analysis of the data may indicate the workflow levels and determine improvements to operating the customized executable system integration software applications. For example, this data may indicate whether the integrated business process is internal or external. Analysis of the data may also indicate the type of process. Based on the aggregate data about the integrated business process, an appropriate information handling system environment may be selected. That may mean allocating more resources such as memory, disk space, static memory resources, or processor power to the operation of an integrated business process. It may also mean selecting a different information handling system or systems, for example within the cloud hosting framework, that have the correct additional resources.

FIGS. 1-7 illustrate a system and method for optimizing business processes running one or more customized executable system integration software applications based on workflow data and/or other inputs. The business process integration for each customized executable system integration software application may be automatically developed on-demand and real-time for an enterprise by a service provider system or server within the network 10 depicted in FIG. 1. The customized executable system integration software applications run one or more business integration processes. Each may integrate one or more internal enterprise applications, one or more types of external applications (for example, those of a trading partner), or some combination of both. The execution of the code for the customized executable system integration software application that integrates the exchange of electronic data is referred to as a business process event. An integrated business process event may exchange any amount of data or any number of documents. The operation of the customized executable system integration software application during an integrated business process event may be monitored in its entirety or in a subset of parts. The monitoring may be customized for various purposes such as testing, health or status of the integrated business process elements, or assessment of usage of the integrated business processes. Other data points may be tracked as well, such as individual information about each document that passes through the system, information about relatedness of inbound and outbound documents, and connector records indicating document classes, types, and filenames of documents that have passed through the connector. This type of data may be referred to as tracking data.

The monitored business process data and tracking data may be reported from the information handling system location operating the runtime engine that runs the customized executable system integration software application. This location may be a hosted runtime engine, a local runtime engine, or some networked combination of either or both. The monitored business process data and tracking data is reported back to a service provider server 80 or may be reported to an information handling system within the enterprise system/network 90.

The customized executable system integration software application may be packaged within a container program, also referred to herein as a dynamic runtime engine. An example runtime engine that may package the customized executable system integration software application is a JAVA runtime engine. The dynamic runtime engine may be an executable software application capable of running on a computer within the enterprise's network, which may include networks owned and/or operated by third party data center providers such as OpSource or Amazon. Alternatively, the runtime engine may be distributed and operate on one or more hosted information handling systems accessible by a customer or user. As changes are made to the model underlying the customized executable system integration software application, the executable software application can automatically check for and apply these changes as needed without requiring human intervention.

Each business process utilizing a customized executable system integration software application is associated with its respective users and/or trading partners. This is the account information for that particular customized executable system integration software application deployment. A service provider or user may choose to group monitored and tracked data to assess the function of customized executable system integration software applications across a broader perspective, for example multiple deployments at a given location or multiple deployments within a given user account. A user account may also have associated sub-accounts or other related accounts. Analysis of the monitored and tracked data results in adjustments to the systems running the customized executable system integration software application at a given enterprise location or in a hosted environment.

Figure 2:
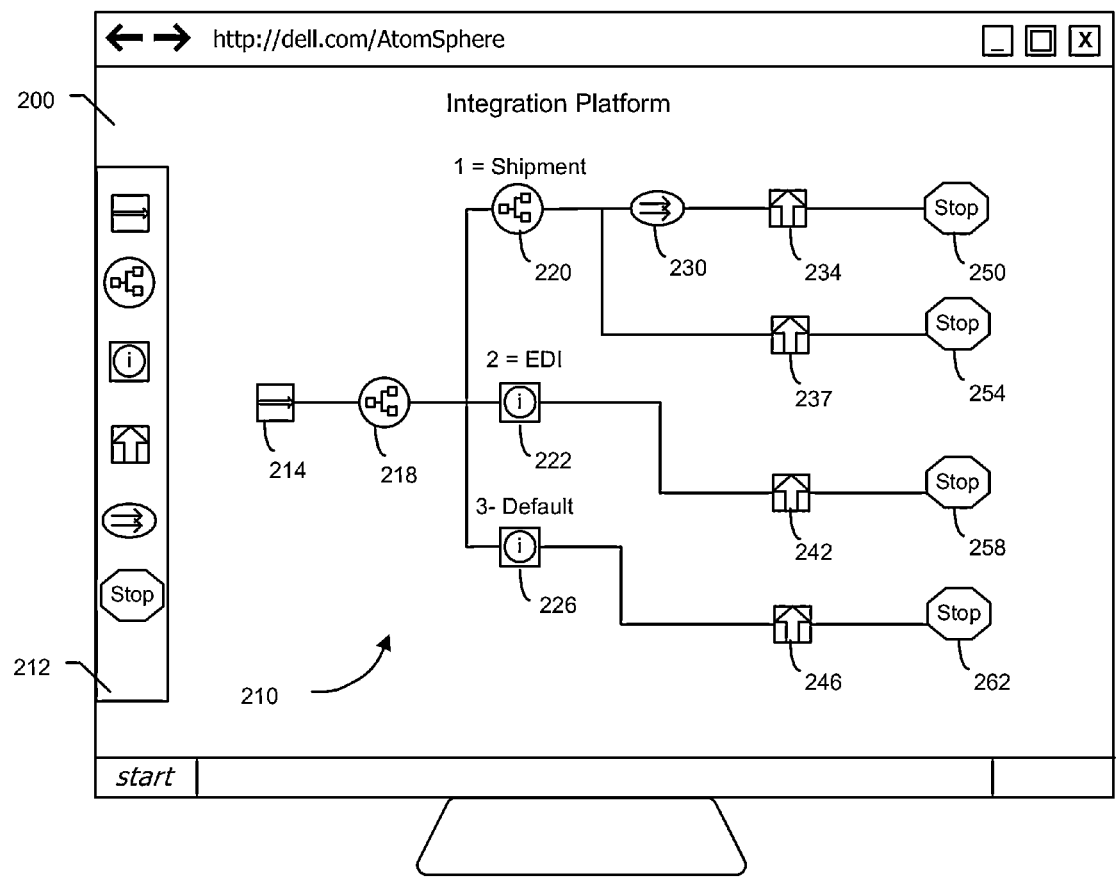
FIG. 2 illustrates a visual model of an example business process according to an embodiment of the present disclosure.

The user may create a model business process or processes to be executed by the customized executable system integration software application via a graphical editor. The exemplary flow diagram of FIG. 2 shows such a modeled business process and includes an Inbound connector element 214, Routing process elements 218 and 220, Document Property elements 222 and 226, Data Transformation process element 230, Outbound connector elements 234, 238, 242, and 246, and Process End elements 250, 254, 258 and 262. Since the elements may require data input from a user, the resulting codesets that make up the customized executable system integration software application contain information about each element. For example, the inbound connector element 214 may be configured for a specific enterprise and process with data input via dialog boxes or selecting menu items, etc. as appropriate. For example, data entry element 214 may be configured such that the input data will be inbound from an SAP system. The element, in combination with data related to that portion of the business process is associated with a specific Connector code set stored in the memory of the system 80. Each Connector is comprised of a modular codeset that is customized for communicating with the specific software application or system. The customized codeset therefore provides connectivity for specific software applications, databases, and/or systems. The outbound connector elements may be similarly configured. For example, the last step of the integrated business process may involve sending shipping order data to Company X system. The Shipping Order will be prepared as an XML message, which is a readily recognizable format. The XML message is then sent to the outbound connector, and the outbound connector converts the XML message from this simple, recognizable format into the proprietary format that is understood by the SAP system. The input and output data formats for the conversion are associated with the modular codeset selected and customized for the outbound connector element. Additionally, the routing element may require custom data associated with it for proper application of the routing logic; the Document Properties element may require input for file naming, file storage location, etc. to be applied. There may be other elements that result in codesets for the customized executable system integration software application as customized by the user and generated by the service provider.

Each branch of the flow diagram represents an end-to-end business process to be integrated. In the example of FIG. 2, the first (top-most) branch may model a process involving receipt of data from an SAP system in a corresponding format, routing the data according to prescribed logic (for example, 1=shipment), further routing according to further logic, transforming the data from the SAP system format to the destination system format by Data Transformation process element 230 to create an appropriately formatted XML document, and then transmitting the transformed data to the destination system in accordance with the properties and attributes of the outbound application connector 234. Examples of other common activities include synchronizing customer data between applications, synchronizing product information between applications, notification of receipt of goods ordered by a retailer, receipt of a work related injury claim, and many others. The model business process or processes are automatically assembled into customized executable codesets that form the customized executable system integration software applications. These customized executable system integration software applications may be run at an enterprise network location or hosted in a cloud computing environment such as one hosted by the service provider.

For example, an enterprise account using a customized executable system integration software application will execute a business process at one or more locations. The business process execution locations for an account are sometimes referred to herein as atoms. However, a given atom may have more than one business process run at the same location. For example, one may be a test business process, while another at the same location may be a "live" operating business process. Operational data may be reported from an account location and a specific atom running an integrated business process.

The execution of the integrated business processes may be monitored by the customized executable system integration software applications themselves. Additionally, more specific information relating to the documents or data processed by the integrated business process may be tracked for one or more executions of the business process. In an example embodiment, this monitored business process data and the tracked data may be ultimately collected by the service provider system/server 80 or some other system or server within the enterprise network 90. Data is gathered for several operational metrics and reported to the service provider database. First, however, monitored business process data and tracking data are recorded and collected at the enterprise or hosted location. While the customized executable system integration software application is running, the data may be kept in RAM or stored at a local database (for example, a disk). Reporting of the operational metrics of the customized executable system integration software application may alternatively be monitored by and reported to a database maintained at the user's enterprise hardware in the Enterprise Systems Network 90. In yet another alternative embodiment, operational metrics for the customized executable system integration software application may be monitored by and reported to systems/servers and database locations of individual trading partners 60 and 70.

During an execution of the customized executable system integration software applications that integrate diverse user applications and business processes, several types of operational metrics and identifying information are gathered and reported. This monitored business process data creates a process execution record. The categories of data that may be monitored in a process execution record are monitored business process data for customized executable codesets that form the customized executable system integration software applications. In other words, the monitored business process data is the data that is kept for each execution of an integrated business process and the aggregated data that is stored for each executable system integration software application deployed for a user.

The customized executable system integration software applications gather and store monitored business process data including, for example: the business process name; the unique identifier of each business process (business process ID); the unique identifier of each business process execution (execution ID); the account identification of the enterprise user of the integration application (account ID); and the identification and name of the enterprise location running the business process integration (account ID and Name). Other identification data may also be monitored and stored such as relatedness data of accounts and connector usage, type, and number deployed. These various types of identification information may be made part of the business process execution record.

The customized executable system integration software application elements measure and store monitored business process data including, for example: the business process integration start time; the business process integration running time; data input levels; data output levels; input document counts; output document counts; throughput levels; execution counts; and overall process errors. Several other factors identifying business processes or measuring usage and activity of the customized executable system integration software applications may also be gathered or measured as monitored data. These various types of metrics may also be made part of the business process execution record. Table 1 shows example types of monitored business process data fields that may be included in the business process execution record.

| FIELD | DESCRIPTION |
| --- | --- |
| Execution ID | Unique identifier assigned to an execution |
| Account ID | Unique identifier assigned to a user or enterprise |
| Location ID and Name | Name and number ID assigned to the location of the business process |
| Location Local ID | ID number of the local location within the cloud hosting the business process |
| Date Group | The day the process ran |
| Deployment ID | A unique identifier pointing to a version of the process |
| Elapsed Time | Duration of time it took to run the process |
| Error | A brief error message, if applicable |
| Error Count | The number of documents that had errors |
| Execution Mode | Whether a manual execution, or a scheduled one, etc |
| Connector Usage | Connector types deployed, names, and the number of connectors |
| Inbound Document Count and Size | The number of documents received inbound and their size |
| Outbound Document Count and Size | The number of documents outbound and their size |
| Throughput | Document inbound size + document outbound size/2 |
| Process ID and Name | Name and unique identifier of a business process |
| Original Execution ID | Applicable if this execution was a retry of a previous execution; unique identifier of the previous execution |
| Retry Flag and Count | Status as a retry and how many |
| Start Step Information | ID, action, name, type, etc. |
| Status | Success, error, or pending |
| Top Level Process ID | If this is a sub process, ID number of the top process |

The business process execution record must at least include the following monitored business process data: the process ID or name, the execution ID, the account ID, and at least one measured data metric.

Additional types of data, referred to as tracked data, may also be gathered relating to the operation of an integrated business process. For example, more in depth information may be important to the service provider, enterprise, or trading partner relating to the documents or data passing through the customized executable system integration software applications. This additional in-depth tracked data can permit, for example, an order to be tracked through the system as it is passed through the customized executable system integration software applications. By way of additional example, tracked data may be information recorded about individual documents. Data such as when a document was processed, how it was processed, a document name or descriptor, the category of document (order, invoice, type of business, or other), which connectors and other elements of the integrated business process the document passed through, and any correspondence related to the document. Examples of tracked data may also include connector read files indicating file names, order numbers, invoice numbers, account identification information, document fields such as account names, relationships between documents and sub-documents of one or more business processes. Tracked information may also include the relationships between inbound and outbound documents; including inbound documents that may split into more than one outbound document or plural inbound documents combined into fewer outbound documents.

To be able to track information or documents, document names or other the identifying information may be recorded at each element or step in the integrated business process. Maintaining these additional records can slow the performance of processing documents and completing the integrated business process. Nonetheless, this type of information and an extended historical archive of this type of information may be relevant in many circumstances. Having data to track a transaction through an integrated business process may be important to both business-to-business and business-to-consumer applications. The information may be used, for example, to identify the progress of a document through an automated system. As another example, if there was an error, this tracked data may allow identification at which step the error occurred.

The monitored business process data and tracked data may be reported back to a common location such as a service provider hosted application or website. In the specific embodiment discussed, the monitored and tracked data is stored locally in RAM and/or on disk until the business process execution is complete. Upon completion, the present embodiment reports the process execution record back to a service provider database.

Data may be taken or reported from individual runtime engines managing specific integrations. Data may also be taken or reported from multiple customized executable system integration software applications for purposes of comparison or overall performance assessment. Thus, potential scope of reported data may be vast. With a potentially vast amount of performance data being monitored, and an even greater amount of data being tracked to business-to-business integrations, the speed of operation of the customized executable system integration software application or applications is materially impacted. Changes may be made to the information handling system environment, such as a cloud-based hosting environment, to optimize the operation of the customized executable integration software application for the detected workflow. The changes may provide greater memory (RAM) resources, greater disk space or static memory, more powerful processors, or additional networks and bandwidth. These adjustments may be particularly relevant to customized executable system integration software applications running in hosted environments. For hosted environments, network resources are shared. Users of these environments pay specifically for the resources used. Therefore, optimization of resource usage may become important.

The present disclosure provides the service provider, enterprise or trading partner with a system and method for triggering adjustments to a hosted operating environment for an integrated business process or processes. The system and method also permits the service provider or enterprise to explicitly select a specific environment for an integrated business process; to define a workload to optimize the environment; or to allow the optimization system to determine resources utilized in the environment. The disclosed system and method gives the user control or provides for automatic optimization of the environment based on monitored and tracked data. Automatic optimization is based in part on the varied, real-time and historical performance information of the integrated business processes and the details of the customized executable system integration software application.

These business process data measurements may be reported from business process flows using the customized executable system integration software application, for example between trading partner and enterprise systems.

Example data may include throughput, process error counts, execution counts, document counts, and connector usage or type. This data reflects business process information relating to trading partners, activities, enterprise applications, function of enterprise system attributes, and/or process attributes that are unique to the end-to-end business integration process of a specific enterprise. The data reflects the units of work and workflow conducted by the system as part of the integration process. For example, the integrated business process transforms data from one format to another, routes data down multiple paths of execution by examining the contents of the data, and business logic may validate the data being processed. The data is provided from one or more of the elements that constitute the exemplary business process flow diagram shown in FIG. 2. The data indicates amount of documents or data, the sources of documents or data, and types of documents or data process by the integrated business process. This information enable prediction of the type of workflow and the appropriate information handling system environment for that workflow.

Part of the monitored business process data may be received from any of the customized codesets represented by Inbound connector elements 214, outbound connector elements 234, 238, 242, and 246, and the other elements in the example end-to-end integration model shown in FIG. 2. Still other monitored business process data and tracked data may be received more generally from the customized executable system integration software application though not from any specific element. In one embodiment, many fields of process identification data may be generally recorded from the customized execution integration application. The monitored business process data is stored in RAM during the execution of the integrated business process. The monitored business process data stored in RAM becomes the business process execution record. Some or all of this record may be stored during or after execution on a disk in the information handling system running the integrated business process. This business process execution record is reported back to the location collecting such data such as the service provider system/server 80 in the present embodiment. Tracked data may be stored in RAM, on disk, or in static memory during execution or after execution of the integrated business process. Tracked data is similarly reported back to a location collecting such data. In the presently described embodiment, this location is the service provider system/server 80.

By way of exemplary embodiment, monitored business process data measured and recorded from an Inbound connector element 214 is specifically described. An Inbound connector element 214 may continuously report its status, for example active or inactive, during operation of the business process integration. The customized code executing the functions of the Inbound connector element 214 may also count and report the number of inbound documents handled by this element. The inbound document count is reported for the given period of time that the Inbound connector element 214 is running that particular business process execution event. The Inbound connector element code may also collect and report data reflecting errors in processing that occur. Finally, the Inbound connector element code may contribute to data collected and reported relating to the amount of data that passes through it. This data reflects some part of the amount of data (in bytes) that passes through the entire customized executable system integration software application. Data may also be collected indicating what is connected to the Inbound connector. For example, data may indicate whether an Inbound connector is receiving data or documents from an external trading partner, from external web requests, or from a location internal to the enterprise user of the integrated business process. The above is just an example of data collected from an Inbound connector.

Similar or analogous data may be collected from other elements including Outbound connector elements. For example, an Outbound connector element may also report status, what it is connected to, outbound document counts, and outbound data volumes.

In addition to collecting data specific to business process elements, the optimization system and the monitoring system and database may also receive overall data relating to the operation of the customized executable system integration software application. For example, each customized executable system integration software application may collect information indicating how many connectors are deployed, start time of the business process execution event, duration of the business process execution event, location identification of the business process execution, account identification for the user of the business process information, how many documents are processed or modified for integration purposes, how much data passes through the integration, and how many errors occur. Further example monitored business process data fields are shown above in Table 1. When data from all elements and the overall customized executable system integration software application has been assembled, a business process execution record is created for the execution of a given integrated business process event.

Tracked data, described above, may also be gathered relating to the execution of an integrated business process. The optimization system and the monitoring system and database may also receive data relating to the documents processed through the customized executable system integration software application. The more in depth tracked data may be gathered, stored, and used by the optimization system. Such data may be important to the service provider, enterprise, or trading partner relating to the information handling system environment running the customized executable system integration software applications.

Figure 3:
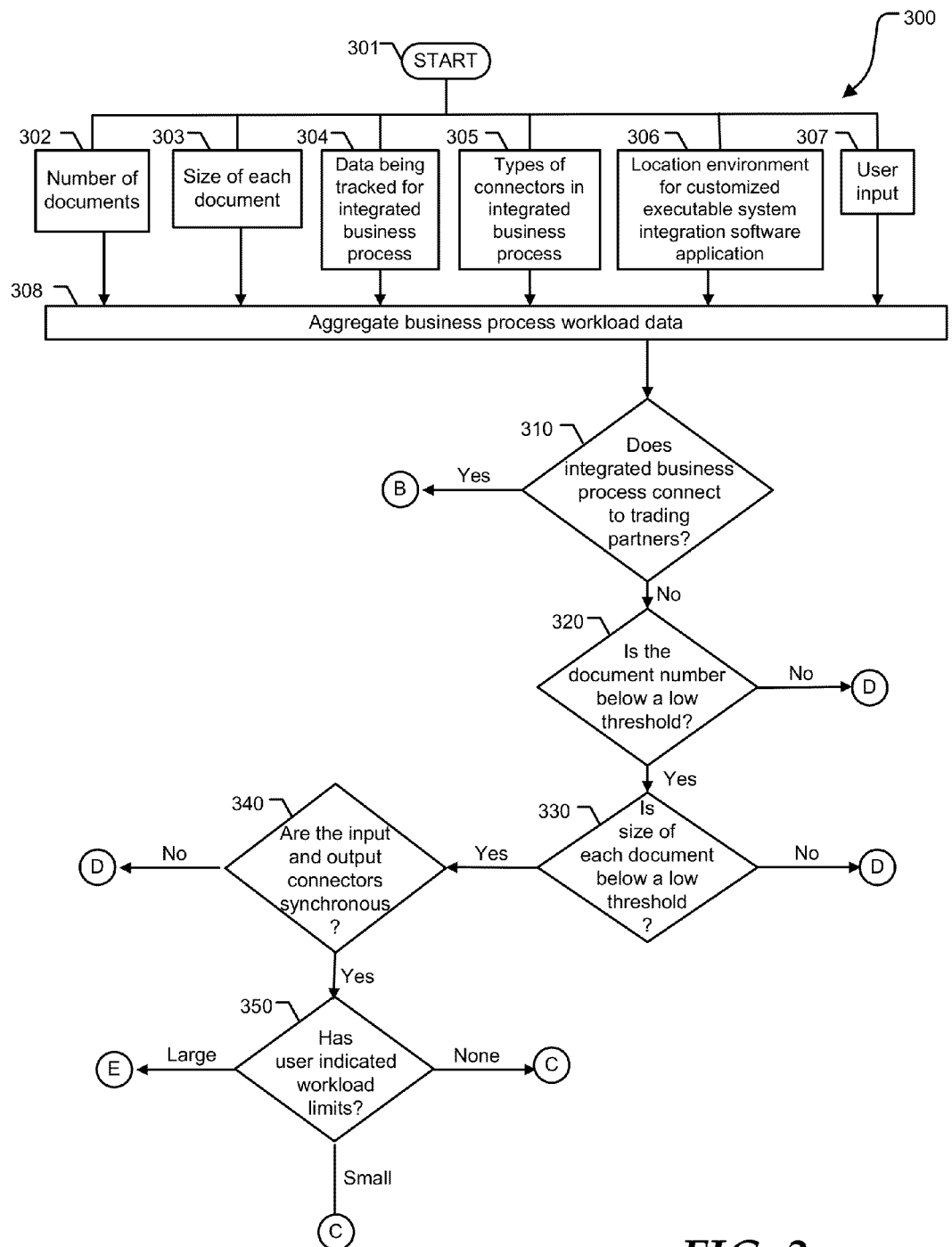
FIG. 3 is a flow diagram illustrating a method according to an embodiment of the present disclosure.

FIG. 3 shows a method 300 in accordance with an embodiment of the present disclosure for determining the type business process execution that is occurring at a given location. The method 300 shows an embodiment for assessing the business process data collected from the elements of a customized executable system integration software application. This exemplary method stores an aggregate set of business process data for a business process running at a location. This aggregate data is analyzed to determine, among other things, how the business process connectors are used, if thresholds of usage are met, where documents are received from and sent to, and whether workload limits have been set by the business process user. The determination of these factors is used to optimize the resources made available to the integrated business process running at the identified location. If the location is a hosted location, the environment determined optimal to run a type of integrated business process is chosen because it has the resources available. However the cost of various hosted environments may vary based on the resources consumed. Thus, the integrated business process user may assert specific control over the environment selected to, for example, the costs involved with hosting such a system.

The flow begins at block 301 where exemplary business process data 302-307 is collected from an integrated business process running at a location, such as a hosted location. In a preferred embodiment, each integrated business process event run by the customized executable system integration software application is assigned a unique identification number or code. In addition, each customized executable system integration software application deployed has a unique identification number or code. The flow proceeds to block 308 where the several types of business process data and tracked data may be collected and stored at the information handling system that determines the optimization of resources allocated to the business process. This aggregate data indicates the workflow trends of an integrated business process on a per execution basis. In one embodiment, the information handling system operating the optimization system is the service provider system/server 80. An information handling system with the enterprise network 90 is also contemplated to run the optimization system.

The flow proceeds to block 310. The optimization system determines whether the integrated business process connectors receive data or documents from external trading partners. If so, this data indicates a business-to-business type of integrated business process. The optimized environment should accommodate increased monitored and tracked data used for archival purposes. Thus, the resources allocated to such an integrated business process would be adjusted accordingly. In a particular example, an environment with increased disk space or solid state drive resources allocated to the integrated business process execution would be selected.

The flow of the presently described embodiment proceeds to block 320 where the optimization system running on the processor at the service provider system/server determines whether the number of documents passing through an integrated business process execution is below a certain threshold. The threshold document count may indicate what type of business process is being executed. In one example embodiment, a document count below a low threshold of 1,000 documents per execution may indicate a service-oriented architecture type of integrated business process needing fast responses. In a service-oriented architecture, the majority of data calls are web service requests where speed of response is important. Allocation of additional memory resources may speed up the integrated business process providing a faster and better experience for the users of the integrated business process. This could reduce the necessary accesses to a slower storage medium such as disk. Of course, the low document threshold levels may be set to a level determined by the service provider or enterprise user. The low document count threshold would indicate the upper level of integrated business process documents that should be processed in a service-oriented architecture. In part, any adjustment to the resource environment is determined in comparison to the resources made available to a normal or baseline level integrated business process execution. In other words, standard resources made available to run the integrated business processes in a hosted environment. These may differ widely depending on the service provider or other host of the system. The thresholds will be set to determine an alteration to those baseline resources, and will be dependent upon what is already generally made available. As discussed more below with reference to FIG. 6, another higher document count threshold may be set as well to detect a large data transfer. Such an integrated business process type has different information handling system environment optimization.

Proceeding to block 330, the optimization system running on the processor at the service provider system/server determines whether the size of the documents passing through an integrated business process falls below a certain threshold in the current embodiment. Smaller size documents may indicate a predominant number of web service requests such as those used in a service-oriented architecture. Also discussed more below with reference to FIG. 6, the system may determine a second higher threshold for the size of the documents passing through an integrated business process to detect a high volume data transfer.

Proceeding to block 340, the input and output connectors are assessed to determine if they are synchronous or asynchronous. In other words, the optimization system determines if data calls by the integrated business process generally come with an expectation of a response to the system from which a document is received. If so, such a synchronous system should have resources to provide quicker response times. In that case, a service-oriented architecture may be the type of integrated business process environment and greater memory and possibly processing resources may be appropriate. If the data calls are asynchronous and no response is generally required, then an environment may not need such speedy resources.

At block 350, the optimization system checks to see if the integrated business process user, such as the enterprise in one example embodiment, has sent data indicating explicit workload limits. The user of a hosted integrated business process may elect to specify the resource limits to be used. This data may be input via a graphical user interface selecting check boxes, drop-down menu elections, or other similar indicators. Such data would be reported back to the optimization system. In the context of hosted or cloud-based systems, customers pay for resources based on usage. Expense may be based on amount of memory, disk space or solid state drive resources consumed or based on the number or amount of processor resources allocated to the customer. Thus, to control the costs of hosting for example, or for any other reason, the data setting of workload limits may trigger a desired level of resources allocated to an integrated business process. Alternatively, the user may desire greater resources, regardless of cost.

Figure 4:
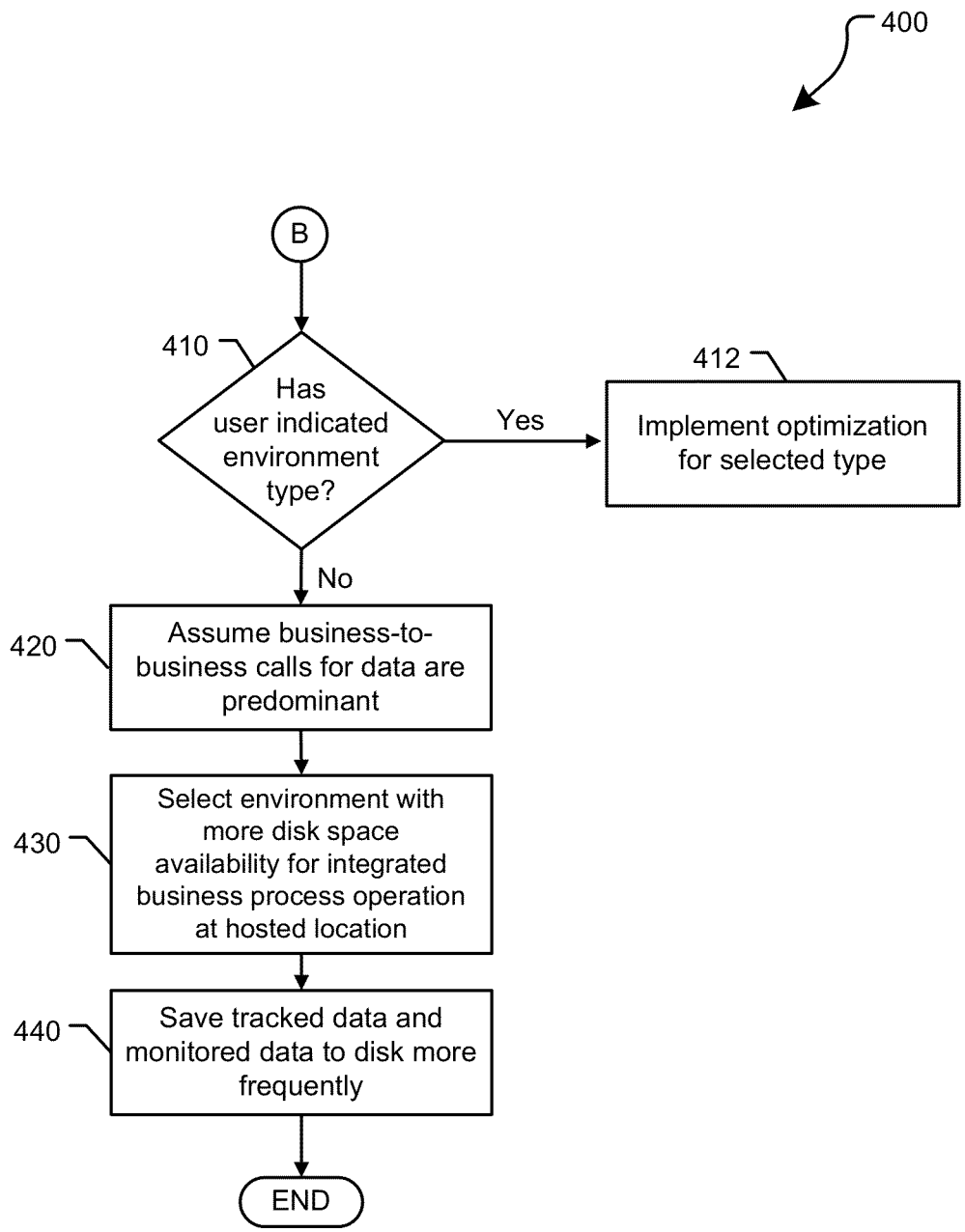
FIG. 4 is a flow diagram illustrating another method according to an embodiment of the present disclosure.

FIG. 4 shows a method 400 in accordance with an embodiment of the present disclosure. The method 400 shows how an optimized environment is selected for an integrated business process where the data indicates that the process is connected to external trading partners. Such data may determine that an environment optimized for business-to-business transactions with additional disk resources should be selected. The integrated business process may be running on an information handling system or systems within the enterprise network 90 or in a hosted or cloud based environment.

The flow begins at block 410 where the optimization system checks to see if the user of the integrated business process has provided input data indicating a specific environment. Such election data would override the automatic selection of an optimized environment. The user of a hosted integrated business process may elect to specify the information handling system environment to be used. This election may override the automatic optimization. This data may be input via a graphical user interface selecting check boxes, drop-down menu elections, or other similar indicators. Such data would be reported back to the optimization system. The selected type of integrated business process would trigger the optimization system to utilize an environment optimized to that elected process type. For example, the data may indicate selection of a normal environment with no special needs, a service oriented architecture, a business-to-business integration, or a large data transfer environment among others.

The flow proceeds to block 420 where if there is not data indicating election of a specific environment, the optimization system assumes a business-to-business environment.

Proceeding to block 430, an environment is selected providing more disk space or solid state drive resources to the integrated business process. In the example embodiment of a hosted or cloud-based integrated business process, additional disk space or solid state drive resources accommodate greater amounts of monitored business process data and tracked data during execution. The monitored and tracked data may also be saved more frequently to disk or the solid state drive at block 440 which, although it may be slower, permits more monitored business process data and tracked data to be stored for archival purposes. These archives may be important in a business-to-business setting.

Figure 5:
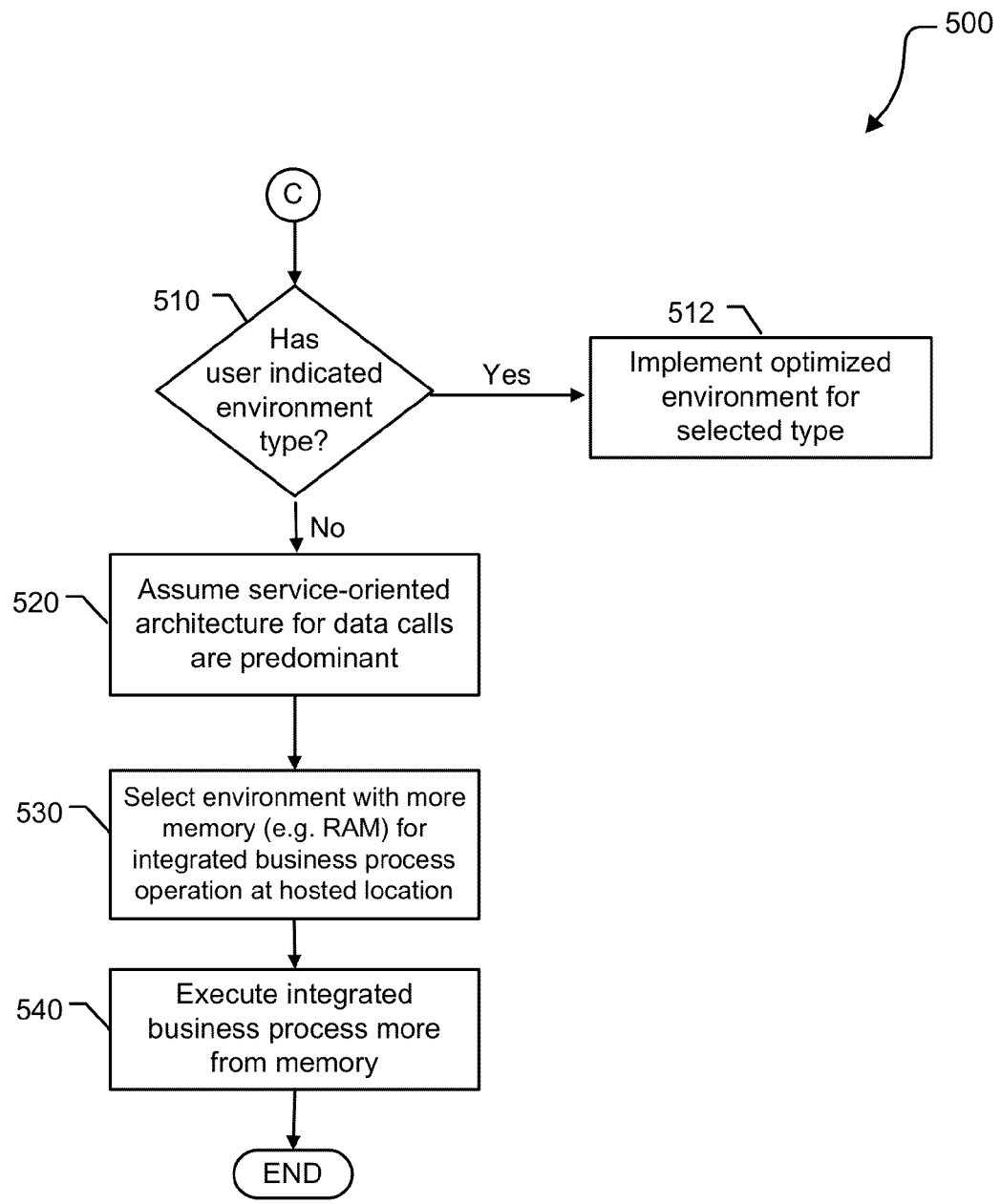
FIG. 5 is a flow diagram illustrating another method according to an embodiment of the present disclosure.

FIG. 5 shows a method 500 in accordance with an embodiment of the present disclosure. The method 500 shows how an optimized environment is selected for an integrated business process where the data indicates that the low document count threshold has not been exceeded, that the low document size threshold has not been exceeded, and that the process is synchronous. Additionally, data indicating a large workload limit has not been received. Some or all of the above indicate that an environment optimized for service-oriented architecture to accommodate many web service requests and transactions should be selected.

The flow begins at block 510 where the optimization system checks to see if the user has provided input data indicating a specific type of the integrated business process. Accordingly, the selected type of integrated business process would trigger the optimization system to utilize an environment optimized to that elected process type.

The flow proceeds to block 520 where if there is no data indicating election of a specific environment, the optimization system assumes a service-oriented architecture optimized to handle web-service requests with a preference for speed of execution.

Proceeding to block 530, an information handling system environment is selected providing more memory to the integrated business process. In the example embodiment of a hosted or cloud-based integrated business process, additional memory allows the information handling system to access disk-based memory less frequently which may speed up execution of the integrated business process. Optionally, an environment may be selected with greater processor resources as well as memory to further enhance the speed of the execution. In accordance with these optimized factors, the business process may be executed more from memory with fewer disk accesses at block 540.

Figure 6:
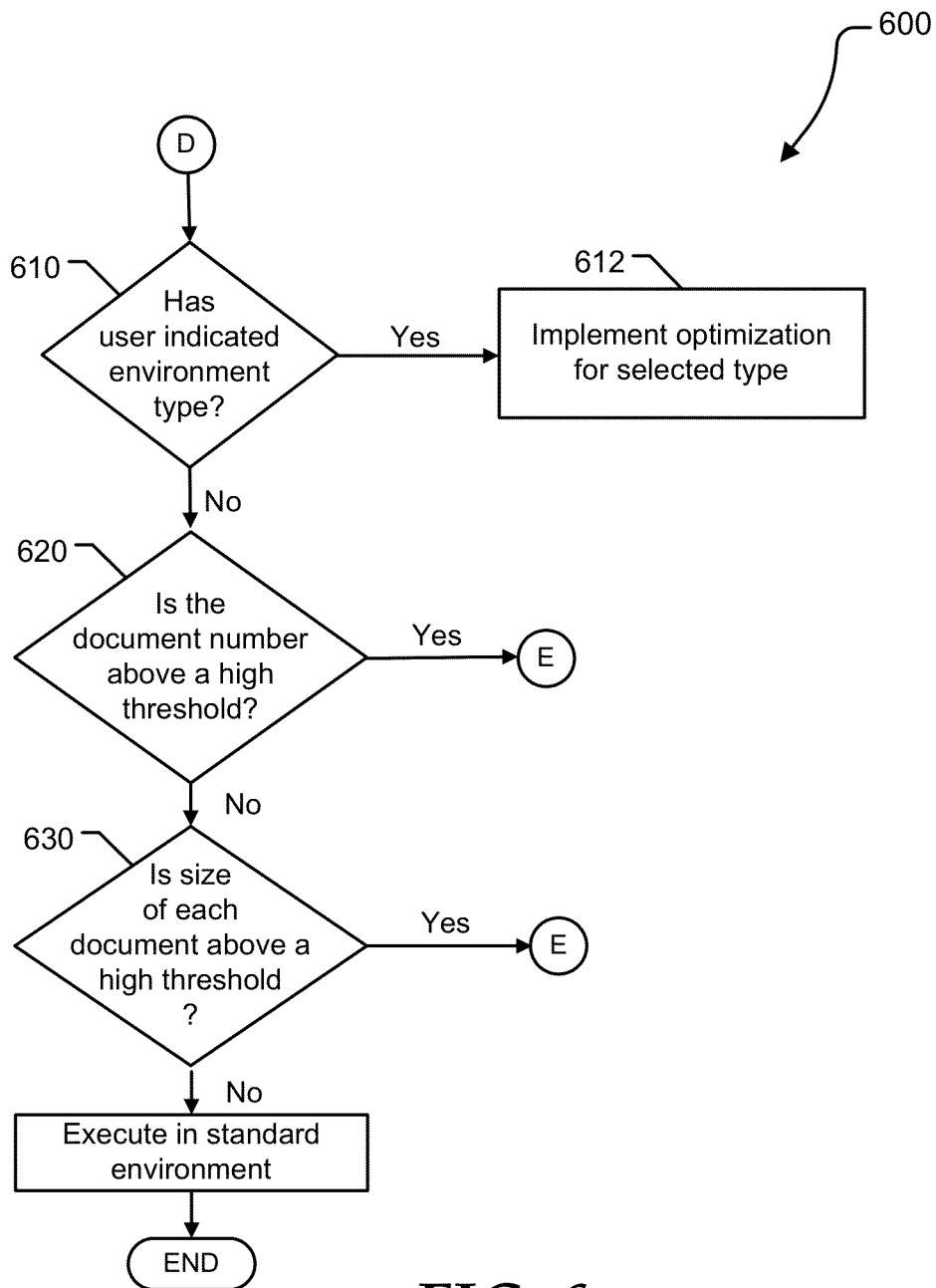
FIG. 6 is a flow diagram illustrating another method according to an embodiment of the present disclosure.

FIG. 6 shows a method 600 in accordance with an embodiment of the present disclosure. The method 600 shows how an optimized environment is selected for an integrated business process where the data indicates that a high document count threshold has been exceeded, that a high document size threshold has been exceeded, or that a large workload limit has been indicated. The high document count threshold and the high document size thresholds are substantially greater than the corresponding low thresholds discusses above. In one example embodiment, a document count above a high threshold of 100,000 documents per execution may indicate a large data transfer type of integrated business process needing substantial resources. This is just one example embodiment and as before, selection of the higher thresholds may be selected by a user or a service provider depending on the baseline information handling system resources made available. In a large data transfer, such as a data warehousing transaction, increased processor, memory, and storage resources should be provided to permit the transaction to occur in a timely fashion. Thus, some or all of the above indications may point to selection of an environment optimized for large data transfers.

The flow begins at block 610 where the optimization system checks to see if the user of the integrated business process has provided input data indicating a specific environment. As before, such election data would override the automatic selection of an optimized information handling system environment. The selected type of integrated business process would trigger the optimization system to utilize an environment optimized to that elected process type.

The flow of the presently described embodiment proceeds to block 620 where the optimization system determines whether the number of documents passing through an integrated business process execution is above a certain high threshold. The threshold document count may indicate what type of business process is being executed. Exceeding the second high threshold may indicate a type of integrated business process involving very large data transfers. In an example embodiment, a high document count threshold per execution may be set at 100,000 documents per execution. The resources at the information handling system running the integrated business process may be selected or adjusted to better accommodate large data transfer type transactions. For example, additional disk space, memory, and processor resources may need to be allocated to accomplish the heavy data transfers. An example heavy data transfer is a data warehousing process. Of course, the high document threshold level may be determined to whatever level the service provider or enterprise user chooses to determine the need to add resources. In part, any threshold will depend on what resources are available to a normal or baseline level integrated business process execution. In the example embodiment, if the baseline resources could not sufficiently handle 20,000 document per execution, then a different high document threshold should be selected to trigger enhancing resources.

Proceeding to block 630, the optimization system running on the processor at the service provider system/server determines whether the size of the documents passing through an integrated business process exceeds a high threshold level. Exceeding this second high threshold may indicate a type of integrated business process involving a transfer of large volumes of data or documents, for example, as with a data warehousing process.

Figure 7:
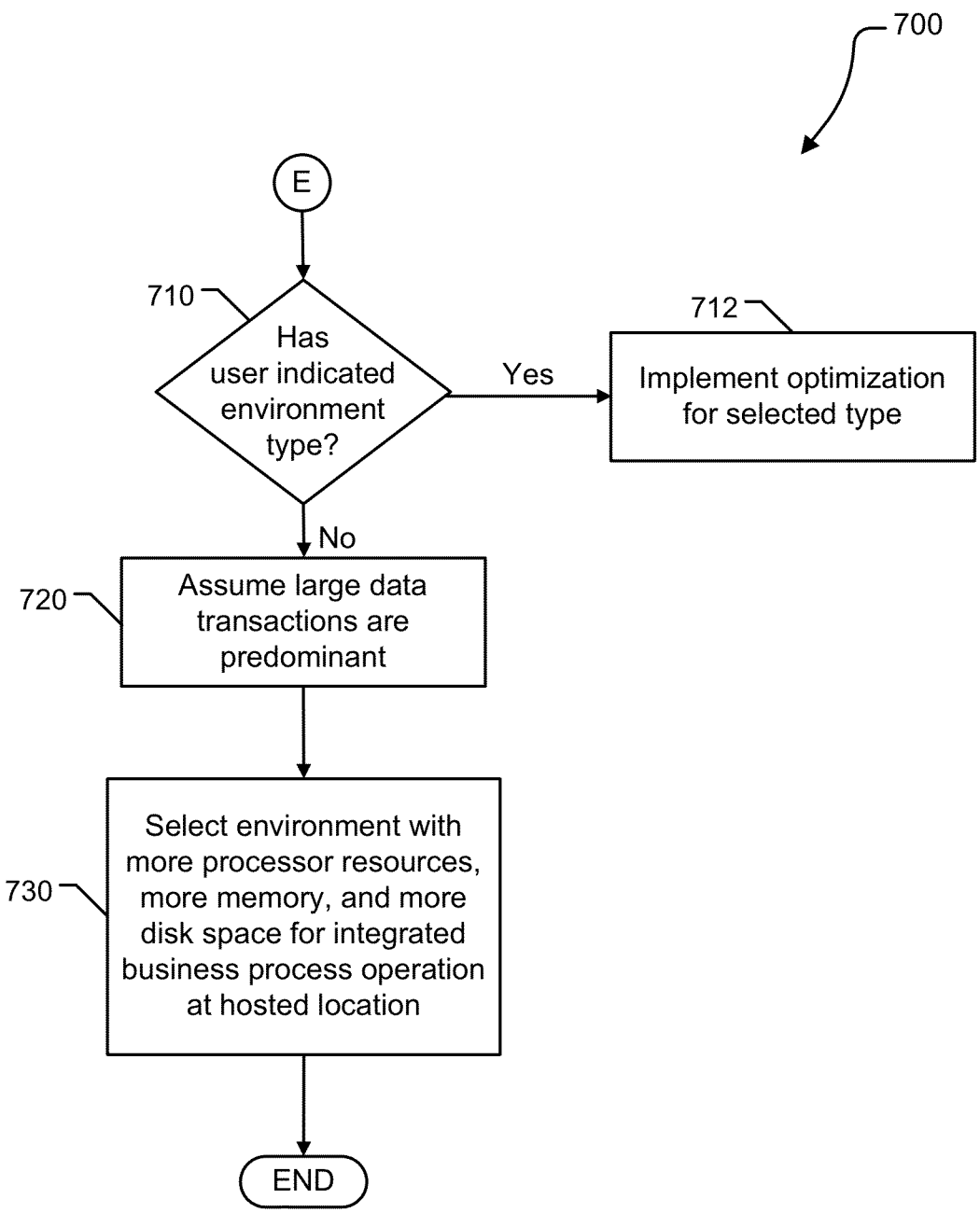
FIG. 7 is a flow diagram illustrating another method according to an embodiment of the present disclosure.

FIG. 7 shows a method 700 in accordance with an embodiment of the present disclosure. The method 700 shows how an optimized environment is selected for an integrated business process where the data indicates that the high document count threshold has been exceeded, that the high document size threshold has been exceeded, or that a large workload limit has been indicated. Some or all of such data may determine that an environment optimized for large data transfers should be selected.

The flow begins at block 710 where the optimization system checks to see if the user of the integrated business process has provided input data indicating a specific environment. Such election data would override the automatic selection of an optimized environment. The selected type of integrated business process would trigger the optimization system to utilize an environment elected. For example, the data may indicate selection of a normal environment with no special changes, a service oriented architecture, a business-to-business integration, or a large data transfer environment, among others.

The flow proceeds to block 720 where if there is no data indicating election of a specific environment, the optimization system assumes a large data transfer environment should be selected. In large data transfers, such as data warehousing efforts, the selected environment should be optimized at many levels to handle the volume of data or documents passed through the integrated business process.

Proceeding to block 730, an environment is selected providing more processing resources, more memory, and more disk space or solid state drive resources to the integrated business process. In the example embodiment of a hosted or cloud-based integrated business process, additional resources of these types allows the information handling system or systems to handle large amount of data and documents to be processed.

The information handling system running the optimization system in the presently described embodiment is located in the service provider system 80. In one particular embodiment, the information handling system running the integrated business process initiates an HTTP or other network protocol based web request to transfer the monitored and tracked data to storage location in the service provider's network 80. Alternatively, a optimization system could be maintained within the enterprise network 90 or hosted externally. The monitored and tracked data is reported back to the optimization system information handling system via well-known networked communication channels using standard communication protocols. Secured communications are preferable, and therefore, encryption techniques may be employed to communicate the monitored business process data and tracked data.

Figure 8:
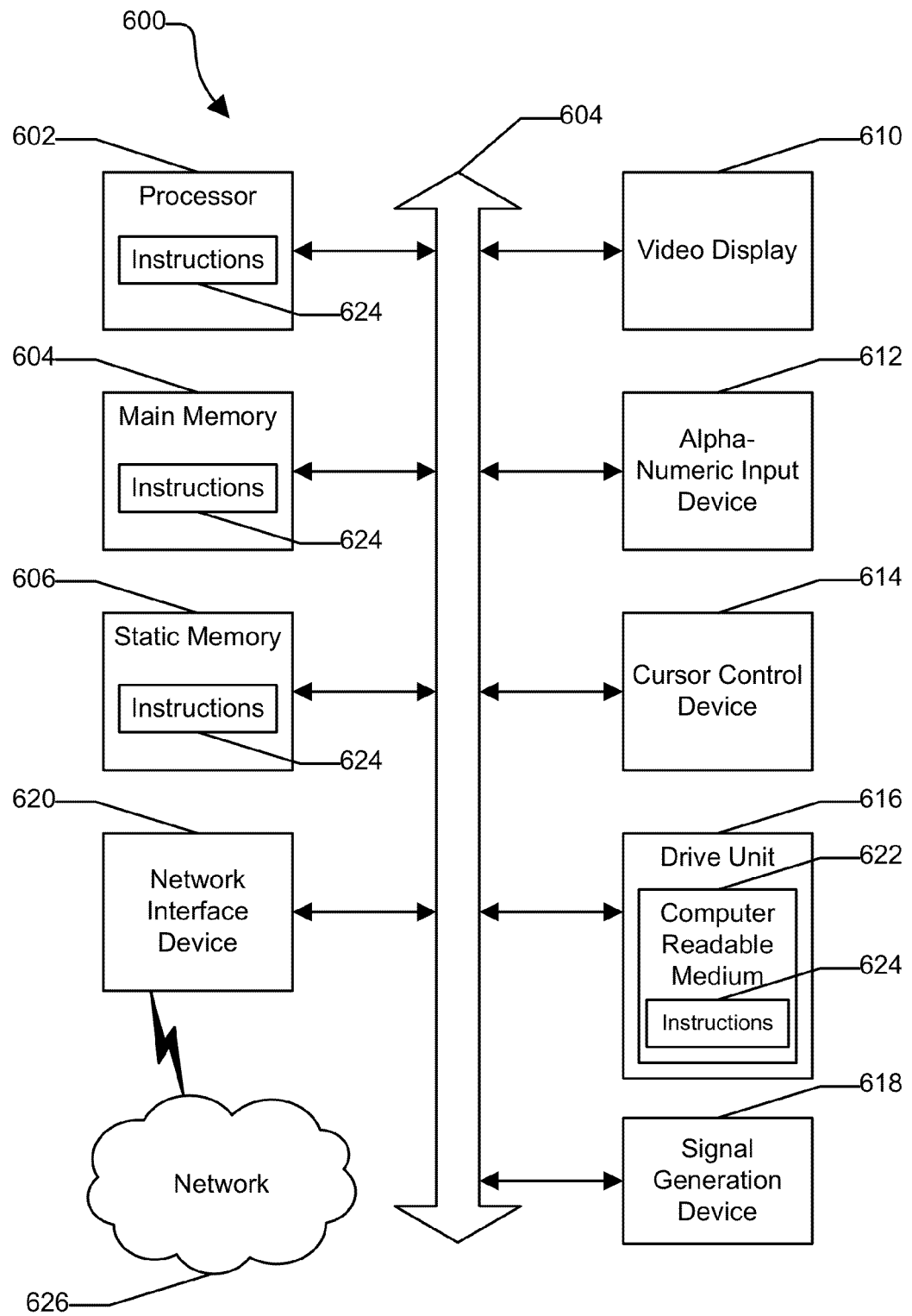
FIG. 8 illustrates a block diagram of an information handling system according to an embodiment of the present disclosure.

FIG. 8 shows an information handling system 800 capable of administering each of the specific embodiments of the present disclosure. The information handling system 800 can represent the user device 20, the systems 30, 60, 70, and 80 of FIG. 1, including the optimization system detecting and determining the type of integrated business process being executed, the system executing an integrated business process, or another data processing device associated with the business network system 10. The information handling system 800 may include a processor 802 such as a central processing unit (CPU), a graphics processing unit (GPU), or both. Moreover, the information handling system 800 can include a main memory 804 and a static memory 806 that can communicate with each other via a bus 808. As shown, the information handling system 800 may further include a video display unit 810, such as a liquid crystal display (LCD), an organic light emitting diode (OLED), a flat panel display, a solid state display, or a cathode ray tube (CRT). Additionally, the information handling system 800 may include an input device 812, such as a keyboard, and a cursor control device 814, such as a mouse. The information handling system 800 can also include a disk drive unit 816, a signal generation device 818, such as a speaker or remote control, and a network interface device 820. The information handling system 800 can represent a server device whose resources can be shared by multiple client devices, or it can represent an individual client device, such as a desktop personal computer.

The information handling system 800 can include a set of instructions that can be executed to cause the computer system to perform any one or more of the methods or computer based functions disclosed herein. The computer system 800 may operate as a standalone device or may be connected such as using a network, to other computer systems or peripheral devices.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The disk drive unit 816 may include a computer-readable medium 822 in which one or more sets of instructions 824 such as software can be embedded. The disk drive unit 816 also contains space for data storage. Further, the instructions 824 may embody one or more of the methods or logic as described herein. In a particular embodiment, the instructions 824 may reside completely, or at least partially, within the main memory 804, the static memory 806, and/or within the processor 802 during execution by the information handling system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 828 can communicate voice, video or data over the network 828. Further, the instructions 824 may be transmitted or received over the network 828 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a connection via a network interface for receiving data representing business process data from an integrated business process running at a location, the business process data comprising at least data indicating from where documents are received, an inbound or outbound document count, and a data amount per document;
    a storage device for storing data representing an aggregate of business process data for an integrated business process;
    a processor configured to determine from the aggregate business process data whether the integrated business process running at the location receives documents from an external trading partner;
    the processor configured to determine from the aggregate business process data whether the integrated business process running at the location processes fewer than a threshold number of documents during an integrated business process execution; and
    the processor configured to determine from the aggregate business process data whether the integrated business process running at the location processes less than a threshold data amount per document during an integrated business process execution;
    wherein if the integrated business process receives documents from the external trading partner, and if the number of inbound or outbound documents is less than the threshold number of documents, and the threshold data amount per document is less than the threshold amount of data, then the processor prepares instructions to select an information handling system environment for running the integrated business process having additional memory resources.

2. The system of claim 1, wherein the processor prepares instructions to select the information handling system environment for running the integrated business process having additional processor resources.

3. The system of claim 1, wherein the business process data further comprises data indicating output connector usage from the integrated business process, and wherein the processor is configured to determine whether the integrated business process must return an output to a sender upon receiving an inbound document, and if so then the processor prepares instructions to select the information handling system environment for running the integrated business process having additional memory.

4. The system of claim 1, wherein if the number of documents exceeds a second threshold number of documents substantially greater than the threshold number of documents, then the processor prepares instructions to select the information handling system environment for running the integrated business process having additional memory resources, additional disk space or solid state drive resources, and additional processor resources.

5. The system of claim 1, wherein the data amount per document exceeds a second threshold data amount per document substantially greater than the threshold data amount per document, then the processor prepares instructions to select the information handling system environment for running the integrated business process having additional memory resources, additional disk space or solid state drive resources, and additional processor resources.

6. The system of claim 1, wherein data received from an integrated business process user selection indicating an integrated business process type overrides the processor instructions and prepares instructions to select a corresponding information handling system environment.

7. A method of optimizing integrated business processes, the method comprising:
    receiving business process data from an integrated business process running at a location, the business process data comprising at least data indicating where documents are received from, an inbound or outbound document count and a data amount per document;
    storing the received business process data with an aggregate of business process data for one or more integrated business processes;
    determining from the aggregate business process data whether the integrated business process running at the location receives documents from an external trading partner;
    determining from the aggregate business process data whether the integrated business process running at the location processes fewer than a threshold number of documents during an integrated business process execution; and
    determining from the aggregate business process data whether the integrated business process running at the location processes less than a threshold data amount per document during an integrated business process execution;
    wherein if the integrated business process receives documents from an external trading partner, and if the number of documents is fewer than the threshold number of documents, and the data amount per document is less than the threshold data amount per document, then preparing instructions to select an information handling system environment for running the integrated business process having additional memory resources.

8. The method of claim 7, further comprising preparing instructions to select the information handling system environment for running the integrated business process having additional processor resources.

9. The method of claim 7, wherein the business process data further comprises data indicating outputs from the integrated business process, and the method further comprises determining whether the integrated business process must return an output to a sender upon receiving a document, and if so then preparing instructions to select the information handling system environment for running the integrated business process having additional memory resources.

10. The method of claim 7, further comprising preparing instructions to select the information handling system environment for running the integrated business process having additional memory resources, additional disk space or solid state drive resources, and additional processor resources if the number of documents exceeds a second threshold number of documents substantially greater than the threshold number of documents.

11. The method of claim 7, further comprising preparing instructions to select the information handling system environment for running the integrated business process having additional memory resources, additional disk space or solid state drive resources, and additional processor resources if the data amount per document exceeds a second threshold substantially greater than the threshold data amount per document.

12. The method of claim 7, wherein data received from an integrated business process user indicating an integrated business process type overrides the processor instructions and prepares instructions to select a corresponding information handling system environment.

13. A non-transitory computer-readable medium including machine executable code for carrying out a method, the method comprising:
    receiving business process data from an integrated business process running at a location, the business process data comprising at least data indicating where documents are received from, an inbound or outbound document count and a data amount per document;
    storing the received business process data with an aggregate of business process data for one or more integrated business processes; and
    determining from the aggregate business process data whether the integrated business process running at the location receives documents from an external trading partner;
    determining from the aggregate business process data whether the integrated business process running at the location processes fewer than a threshold number of documents during an integrated business process execution; and
    determining from the aggregate business process data whether the integrated business process running at the location processes less than a threshold data amount per document during an integrated business process execution;
    wherein if the integrated business process receives documents from an external trading partner, and if the number of documents is fewer than the threshold number of documents, and the data amount per document is less than the threshold data amount per document, then preparing instructions to select an information handling system environment for running the integrated business process having additional memory resources.

14. The non-transitory computer-readable medium of claim 13, the method further comprising preparing instructions to select the information handling system environment for running the integrated business process having additional memory resources, additional disk space or solid state drive resources, and additional processor resources if the number of documents exceeds a second threshold number of documents substantially greater than the threshold number of documents.

15. The non-transitory computer-readable medium of claim 13, the method further comprising preparing instructions to select the information handling system environment for running the integrated business process having additional memory resources, additional disk space or solid state drive resources, and additional processor resources if the data amount per document exceeds a second threshold substantially greater than the threshold data amount per document.

16. The non-transitory computer-readable medium of claim 13, wherein preparing instructions to select the information handling system environment for running the integrated business process having additional memory resources further comprises preparing instructions to allocate additional memory resources at the information handlings system location running the integrated business process.

17. The non-transitory computer-readable medium of claim 13, wherein preparing instructions to select the information handling system environment for running the integrated business process having additional memory resources further comprises preparing instructions to select a different information handling system location having additional memory resources to run the integrated business process.

18. The non-transitory computer-readable medium of claim 13, wherein the business process data further comprises data indicating outputs from the integrated business process, and the method further comprises determining whether the integrated business process must return an output to a sender upon receiving a document, and if so then preparing instructions to select the information handling system environment for running the integrated business process having additional memory resources.

* * * * *